Jan. 5, 1965  A. SEIZINGER  3,164,057
FOCUSING DEVICE FOR ENLARGERS AND THE LIKE
Filed July 28, 1961  10 Sheets-Sheet 3

INVENTOR.
AUGUST SEIZINGER
BY

Jan. 5, 1965    A. SEIZINGER    3,164,057
FOCUSING DEVICE FOR ENLARGERS AND THE LIKE
Filed July 28, 1961    10 Sheets-Sheet 5

INVENTOR.
AUGUST SEIZINGER
BY

Jan. 5, 1965  A. SEIZINGER  3,164,057
FOCUSING DEVICE FOR ENLARGERS AND THE LIKE
Filed July 28, 1961
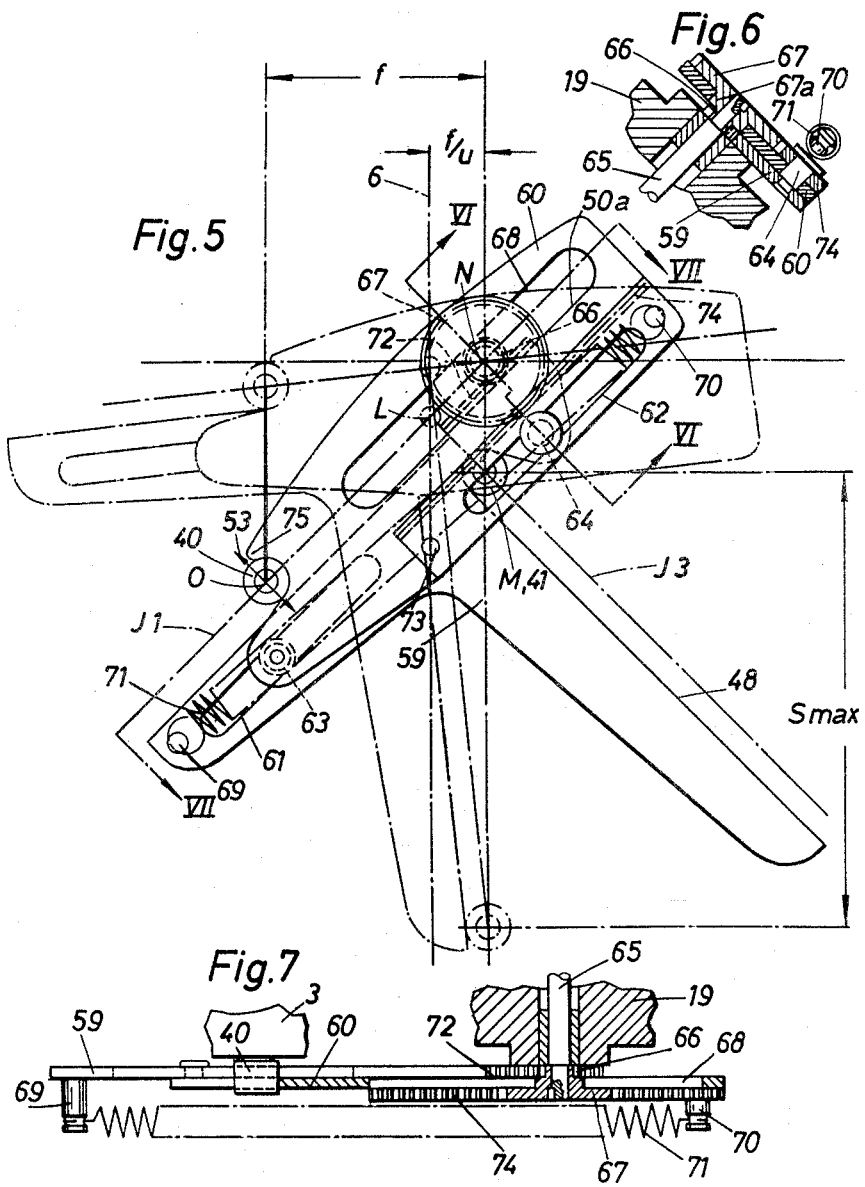
INVENTOR.
AUGUST SEIZINGER
BY Michael S. Striker
Attorney

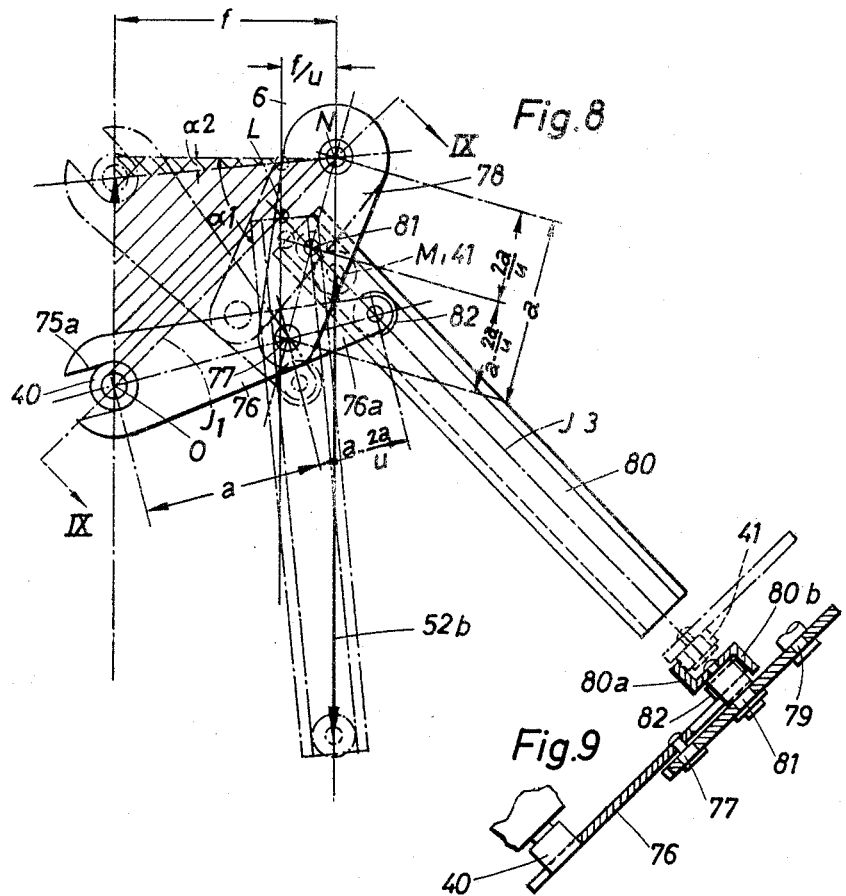

United States Patent Office 3,164,057
Patented Jan. 5, 1965

3,164,057
FOCUSING DEVICE FOR ENLARGERS
AND THE LIKE
August Seizinger, Munich, Germany, assignor to Agfa Aktiengesellschaft, Leverkusen-Bayerwerk, Germany
Filed July 28, 1961, Ser. No. 127,719
Claims priority, application Germany, July 30, 1960,
A 35,242
22 Claims. (Cl. 88—24)

The present invention relates to the art of photography, and more particularly, the present invention relates to photographic enlargers, copiers, and the like.

In devices of this type there are two carriers, one carrier supporting the positive or the like on which the photographic reproduction is to be made and the other carrier supporting the negative, transparency, or the like which provides the image which is to be reproduced. Between these carriers is located an objective, and in order to provide varying degrees of enlargement the distance between the pair of carriers is adjusted and also the position of the objective along the optical axis is adjusted so as to provide a sharp focusing along with a maintenance of the desired degree of enlargement. Thus, while the distance between the carriers is changed, the carrier for the negative or the like generally being moved along the optical axis with respect to the carrier for the positive, the objective moves along with the movable carrier but at the same time has its distance with respect to the movable carrier changed so as to provide proper focusing.

It is necessary for best results to very precisely regulate the position of the objective between the pair of carriers when the distance between the pair of carriers is changed so as to provide a desired degree of enlargement, and at the present time the known structures for accomplishing this result are all extremely bulky and cumbersome and they operate only with difficulty because of the great friction and wear between the parts. As a result, such structures, although known, have not come into wide use, and instead there is generally used in the art a camming arrangement which is far more compact and easy to operate but which on the other hand does not provide the highest degree of accuracy in the adjustment. Moreover, whenever an objective of one focal length is exchanged for an objective of a different focal length it is necessary to provide an entirely different camming structure with these known arrangements.

One of the objects of the present invention is to provide for a photographic enlarger, copier, or the like, a structure which will very accurately adjust the position of the objective when the distance between the carriers is changed, while at the same time being extremely compact, light, and easy to operate.

It is also an object of the present invention to provide a structure of the above type which is easily adjustable so as to accommodate objectives of different focal lengths.

It is also an object of the present invention to provide a structure which will operate automatically at least in part so as to accommodate objectives of different focal lengths.

A further object of the present invention is to provide a structure which adjusts the position of the objective and which is required to move only through a fraction of the change in the distance between the carriers for the negative and positive in order to adjust the objective.

An additional object of the present invention is to provide a structure which can accomplish the above objects and which at the same time is composed of a relatively small number of simple, rugged elements which cooperate with each other so as to provide an adjustment of the highest degree of accuracy while at the same time not requiring maintenance and providing extreme convenience in operation.

With the above objects in view the invention includes, in a photographic enlarger, copier, or the like, an objective means which has an optical axis and which is movable therealong. A stationary carrier and a movable carrier are respectively located on opposite sides of the objective means along the optical axis, and the stationary carrier is adapted to carry a positive on which a reproduction is to be made while a movable carrier is adapted to carry a negative, transparency, or the like which provides the image which is to be reproduced. A bearing means is carried by the movable carrier and is fixed with respect thereto, and this bearing means provides a turning axis which is perpendicular to a plane which includes the optical axis and this turning axis of the bearing means is spaced from the optical axis by a distance which is equal to the focal length of the objective means. A drive means is movable and located at all times along a first straight line which is in the above plane and which is parallel to the optical axis and intersects the turning axis of the bearing means. A lever means cooperates operatively with the objective means, the bearing means, and the drive means for turning about the turning axis of the bearing means and for moving the objective means along the optical axis during movement of the drive means along the above-mentioned first straight line, and this lever means maintains the intersection between a second straight line, which is in the above plane and which interconnects the objective means and the turning axis of the bearing means, and a third straight line, which is also in the above plane and which is perpendicular to the second straight line and passes through the drive means, at all times in a fourth straight line which is parallel to and located between the optical axis and the above-mentioned first straight line along which the drive means moves. A moving means is provided to move the movable carrier with respect to the stationary carrier, and a step-down transmission is actuated by the moving means and moves the drive means along the above-mentioned first straight line. The step-down transmission of course moves the drive means along the first straight line by a distance which is a predetermined fraction of the distance through which the moving means moves the movable carrier, and this fraction is equal to the ratio of the distance between the above-mentioned first and fourth straight lines with respect to the focal length of the objective means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 illustrates another embodiment of a structure according to the invention for adjusting the enlarger or the like;

Figure 4:
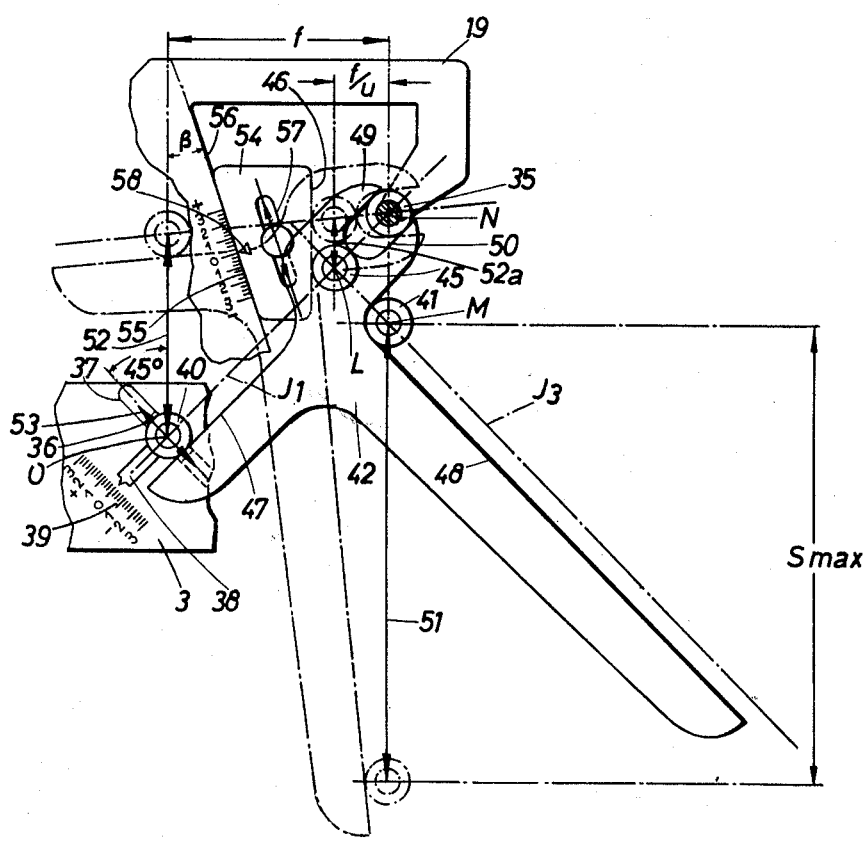
Figure 4A:
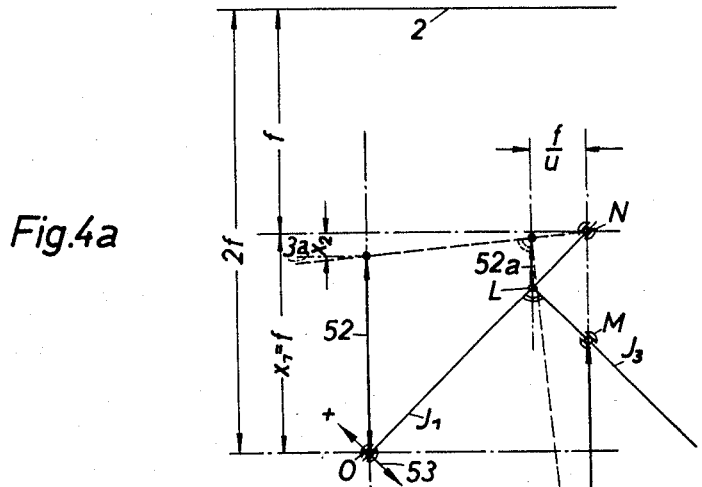
Figure 4B:
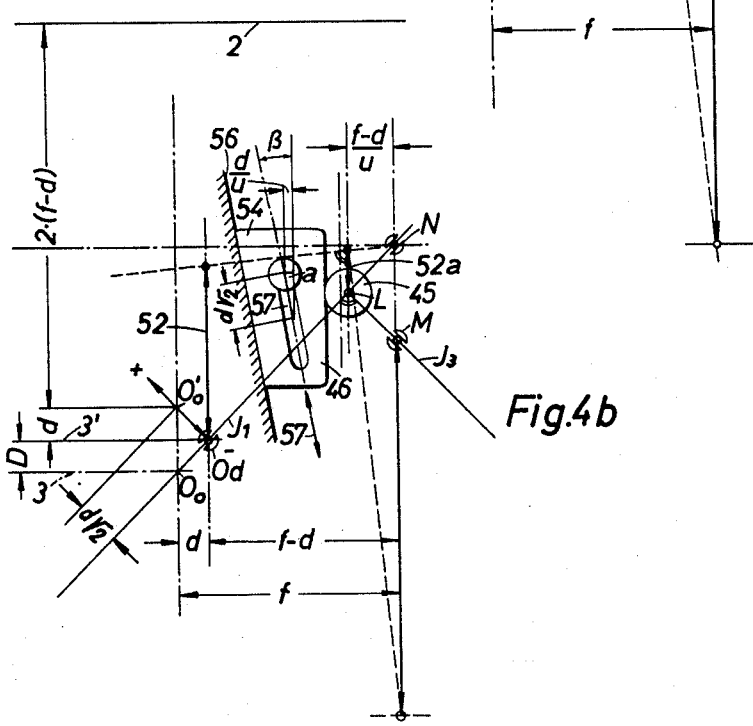
Figure 5A:
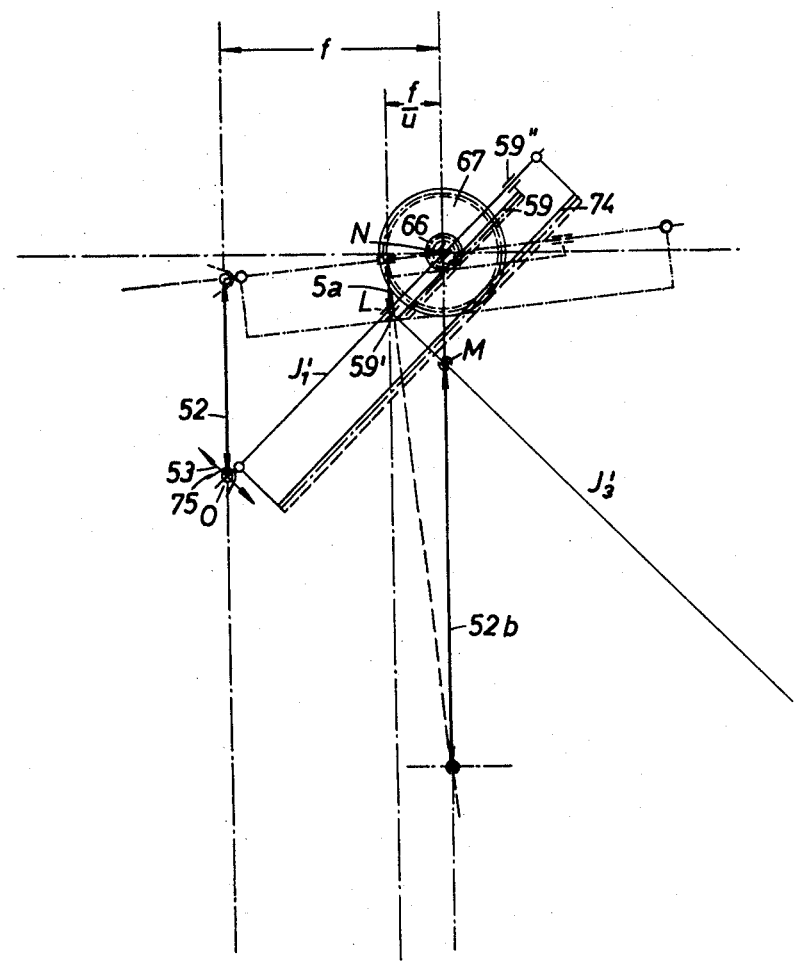
Figure 8A:
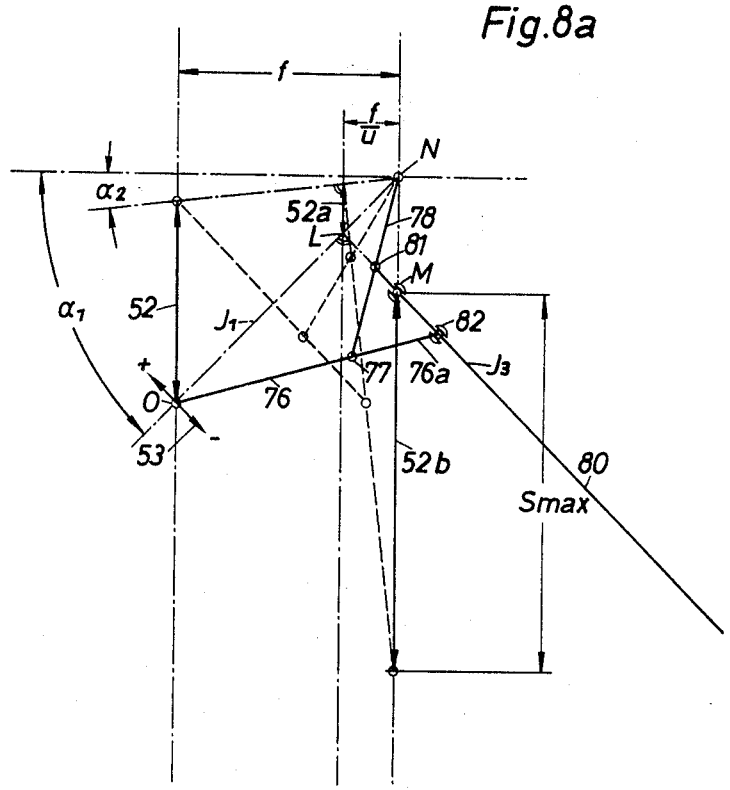
Figure 10:
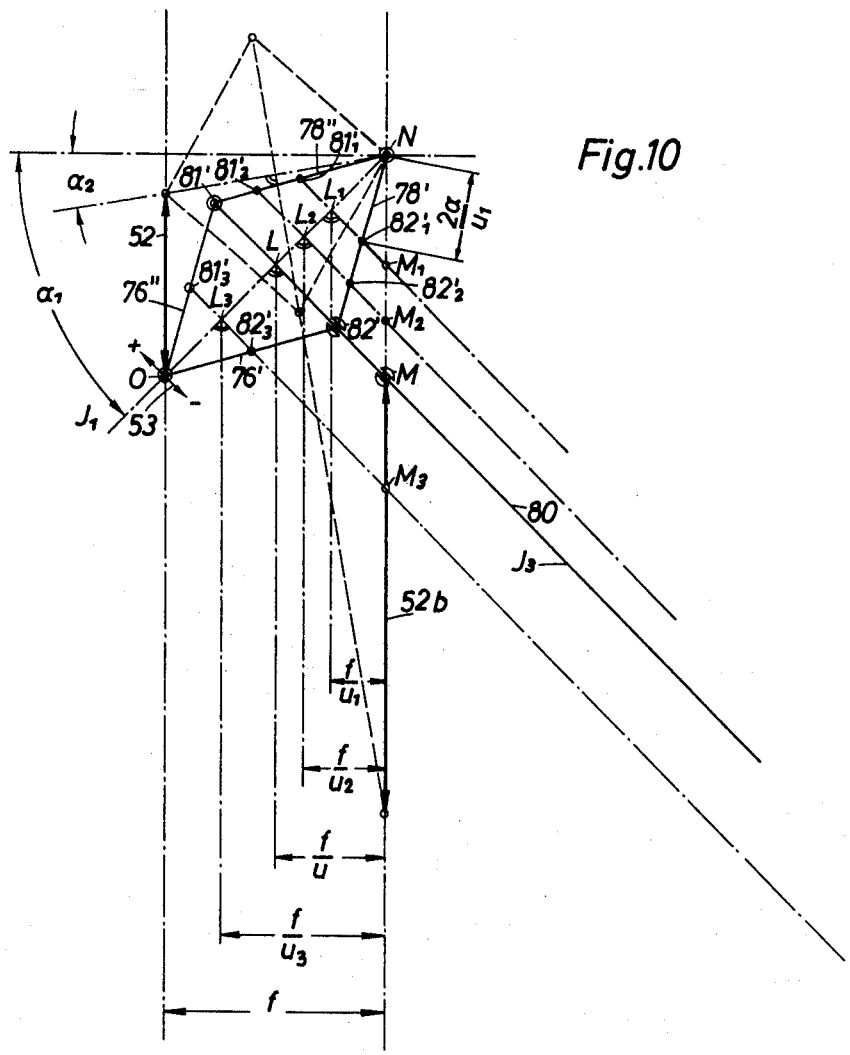

FIG. 4a schematically illustrates the structure of FIG. 4 so as to show the manner in which this structure operates;

FIG. 4b shows how the structure of FIGS. 4 and 4a can be adjusted so as to accommodate an objective of a different focal length;

FIG. 5 illustrates a further embodiment of a structure according to the present invention;

FIG. 5a schematically illustrates the structure of FIG. 5 so as to show how this structure operates;

FIG. 6 is a fragmentary sectional view taken along line VI—VI of FIG. 5 in the direction of the arrows;

FIG. 7 is a sectional view taken along line VII—VII of FIG. 5 in the direction of the arrows;

FIG. 8 illustrates still another embodiment of a structure according to the present invention;

FIG. 8a indicates diagrammatically the operation of the structure of FIG. 8;

FIG. 9 is a sectional view taken along line IX—IX of FIG. 8 in the direction of the arrows; and FIG. 10 is a diagrammatic illustration of still another embodiment of a structure according to the present invention.

Figure 1:
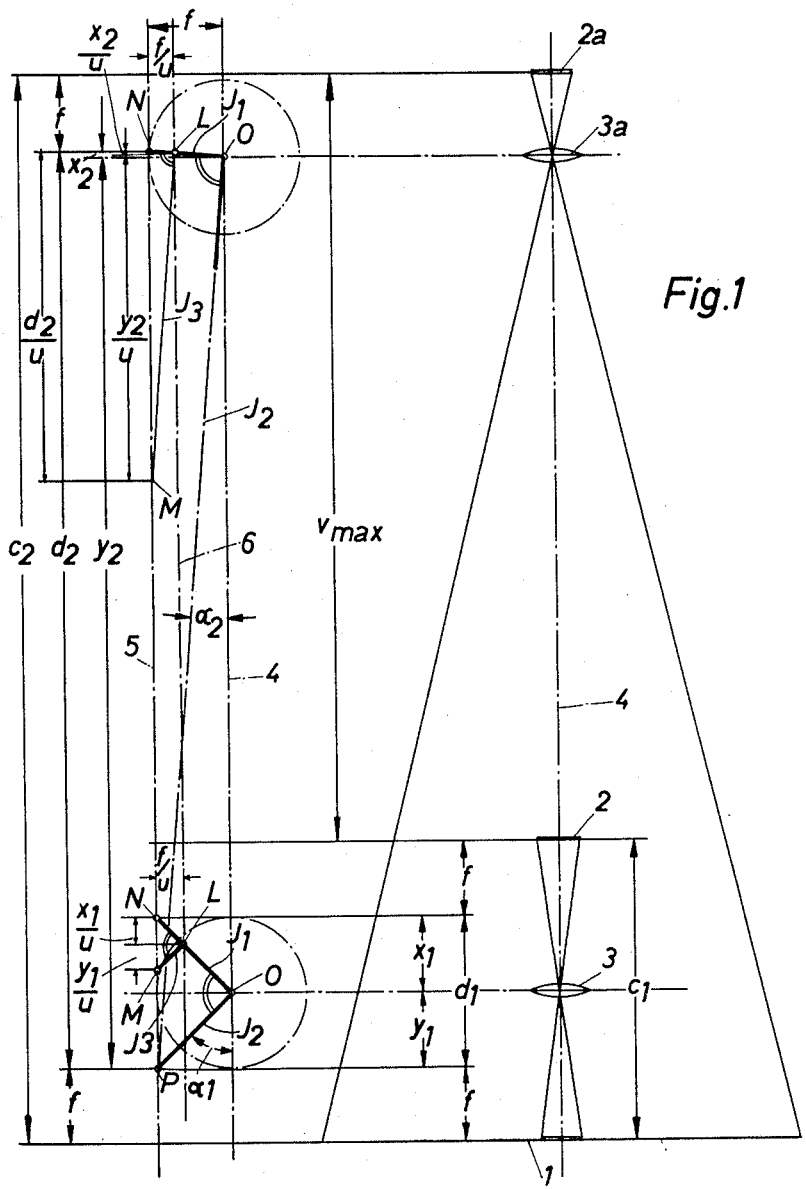
FIG. 1 is a schematic illustration of the structure of a photographic enlarger or the like in two different positions, FIG. 1 illustrating the principle of operation of the structure of the invention.

Referring to FIG. 1 there is shown at the lower right portion thereof, in a diagrammatic manner, a carrier 1 which is adapted to carry the positive which is to be provided with a photographic reproduction. Above the carrier 1 is located a carrier 2 which is adapted to carry the negative, transparency, or the like which provides the image which is to be reproduced, and between the carriers 1 and 2 is located the objective 3. All of the parts 1–3 are located along the optical axis 4 of the objective 3, and the parts are shown in the lower right portion of FIG. 1 in the position they take when providing an enlargement ratio of 1:1. At the upper right portion of FIG. 1 the carrier 2 is shown in the position $2a$ and the objective 3 is shown in the position $3a$, and in this position a much larger degree of enlargement will be provided, the parts 2 and 3 when in the positions $2a$ and $3a$ providing, for example, the largest extent of enlargement possible with the particular enlarger. Of course, the positive carrier 1 is stationary while the negative carrier 2 is movable along the optical axis and while the objective 3 moves with the movable carrier 2 along the optical axis it is also movable with respect to the movable carrier 2 so as to provide proper focusing.

As is well known the parts 1–3 must have with respect to each other positions which will always satisfy the equation $$x \cdot y = f^2$$

where $x$ is equal to the distance between the negative and the objective minus the focal length of the objective, where $y$ is the distance between the positive and the objective minus the focal length, and where $f$ is the focal length of the objective 3.

When the parts are in the position shown at the lower right of FIG. 1 the distance between the stationary carrier 1 and the movable carrier 2 is $c_1$, while when the parts are in the position with the movable carrier and objective located at $2a$ and $3a$ the distance between the movable carrier and the stationary carrier is $c_2$.

The optical axis 4 of the objective is reproduced in FIG. 1 just to the left of the center part thereof, and to the left of this optical axis 4 is shown a straight line 5 which is parallel to the optical axis and which is spaced therefrom by the focal length $f$ of the objective 3. If a negative bearing element N and a positive bearing element P are respectively located along the line 5 at distances from the negative and positive carriers 2 and 1, respectively, equal to the focal length $f$, as indicated on line 5 in FIG. 1, then the distance PN will always be divided by a horizontal line passing through the objective O in such a manner that the distances $x$ and $y$ multiplied by each other will always equal the square of the focal length of the objective. The distances $x_1$ and $y_1$ represent the divisions of the line PN when the parts are positioned as shown at the lower right of FIG. 1 to provide a 1:1 ratio of enlargement, and the distances $x_2$ and $y_2$ indicate the division of the line PN when the parts are positioned to provide the maximum degree of enlargement, which is to say when the movable carrier and the objective are at the positions $2a$ and $3a$. The distance between elements P and N when providing a 1:1 enlargement ratio is indicated at $d_1$, while the distance between elements P and N when providing the maximum enlargement ratio is indicated at $d_2$. The distance $v_{max}$ indicates the entire range of movement of the movable carrier 2.

Geometrically it is possible to represent the relationship of the distances $x$ and $y$ with respect to each other by an angle which includes a leg $J_1$ and a leg $J_2$ intersecting the leg $J_1$ at the objective O. Thus, the intersection of the legs $J_1$ and $J_2$ of the angle representing the ratio between the distances $x$ and $y$ will always be located in the optical axis 4 at a distance from the straight line 5 equal to the focal length. It will be noted that when the parts are in the position providing a 1:1 ratio of enlargement there is between the leg $J_2$ and the optical axis 4 an angle $\alpha_1$, while when the parts are in the position providing the maximum degree of enlargement this angle between the leg $J_2$ and the optical axis is $\alpha_2$. Thus, in order to provide for proper focusing of the objective it is only necessary to have a bell crank lever whose legs are made of telescoped elements, for example, so that the legs are capable of expanding and contracting, and the intersection between the legs and the bell crank lever can be connected to the objective while the outer eds of the legs of such a bell crank lever are respectively connected to the bearings N and P. Thus, with such an arrangement where the bearing N is connected to the movable carrier 2 so as to be movable therewith and the bearing P is connected to a stationary carrier 1 so as to remain stationary therewith and where the movable carrier and objective are guided for vertical movement, the objective will always be properly focused. In other words such a bell crank will always have its legs extending along the legs $J_1$ and $J_2$ and the free ends of these legs will always be in the line 5 so that in this way the objective will always be automatically focused. The disadvantage of such a construction is not only the great friction and awkwardness of the telescoped elements, for example, but also the fact that one of the legs of such a bell crank lever will have to extend from the bearing P all the way up to the objective O when the parts are in the position providing the greatest degree of enlargement, and thus such a construction is extremely bulky and difficult to operate because of the great friction between the parts so that it is not very practical.

In accordance with the present invention it is possible, without in any way detracting from the accuracy of the setting, to greatly decrease the size of the structure which is required to regulate the position of the objective during movement of the movable carrier 2 toward and away from the stationary carrier 1. In accordance with the invention there is provided a driving means or driving member M located along the line 5 which interconnects the bearings P and N, and the structure which moves the movable carrier 2 moves the driving means along the line 5 through a step-down transmission so that the member M will move through only a fraction of the distance that the movable carrier 2 moves through. The drive means M which drives the linkage connected to the objective means 3 is connected with the arm $J_1$ through an arm $J_3$ which remains at all times perpendicular to the arm $J_1$. The intersection L between the arms $J_1$ and $J_3$ remains at all times along a straight line 6 which is, as indicated in FIG. 1, in the plane which includes the optical axis 4 and the straight line 5 along which the drive means M moves, and the distance of the straight line 6 where the intersection L is always located from the straight line 5 has with respect to the focal length F, a ratio $u$ which is equal to the transmission ratio provided by the step-down transmission which moves the drive means M along the line 5 in response to movement of the movable carrier 2 along the optical axis. Moreover, it will be noted that with respect to the bearing N the drive means M moves at all times in the direction opposite to the direction of movement of the objective O along the optical axis 4. Thus, while the objective O moves upwardly along the optical axis 4 the drive means M moves downwardly along the line 5 with respect to the bearing N, while when the objective O moves downwardly along the line 4 the drive means M approaches closer to the bearing N and is actually moving upwardly with respect to the bearing N, although all of the elements are moving up and down together. In other words, as the objective moves upwardly the drive means M will also move upwardly but at a lesser rate than the upward movement of the objective so that the distance between the bearing N and the drive means M increases at this time, while when the objective moves down the drive means M moves downwardly at a lesser rate than the objective and thus approaches closer to the bearing N. Thus, with the structure of the invention it is possible to entirely eliminate the arm $J_2$, and instead it is possible to use a relatively small substantially T-shaped lever means having a cross-bar portion extending between and connected to the bearing N, which is fixed with respect to the movable carrier 2, and the objective means O, and having a leg portion $J_3$ which at all times remains perpendicular to the cross-bar portion and which is connected at its free end to the drive means M which moves at all times along the line 5 which passes through the bearing N and which is spaced from the optical axis by the focal length $f$ of the objective means O. As was pointed out above, the intersection L between the cross-bar portion and leg portion of such a T-shaped lever will always remain in the line 6 which is parallel to and located between the optical axis 4 and the line 5 and which is spaced from the line 5 by a distance which has with respect to the focal length a ratio equal to the step-down transmission ratio which moves the drive means M which actuates this substantially T-shaped lever means. As is apparent from FIG. 1, the structure of the invention, instead of providing a distance $d_2$ through which the parts must move, this distance has been reduced to the distance $d_2/u$, and in the same way the distance $y_2$ has been reduced to the distance $y_2/u$, and the same is true of the other distances, as indicated in FIG. 1.

Figure 2:
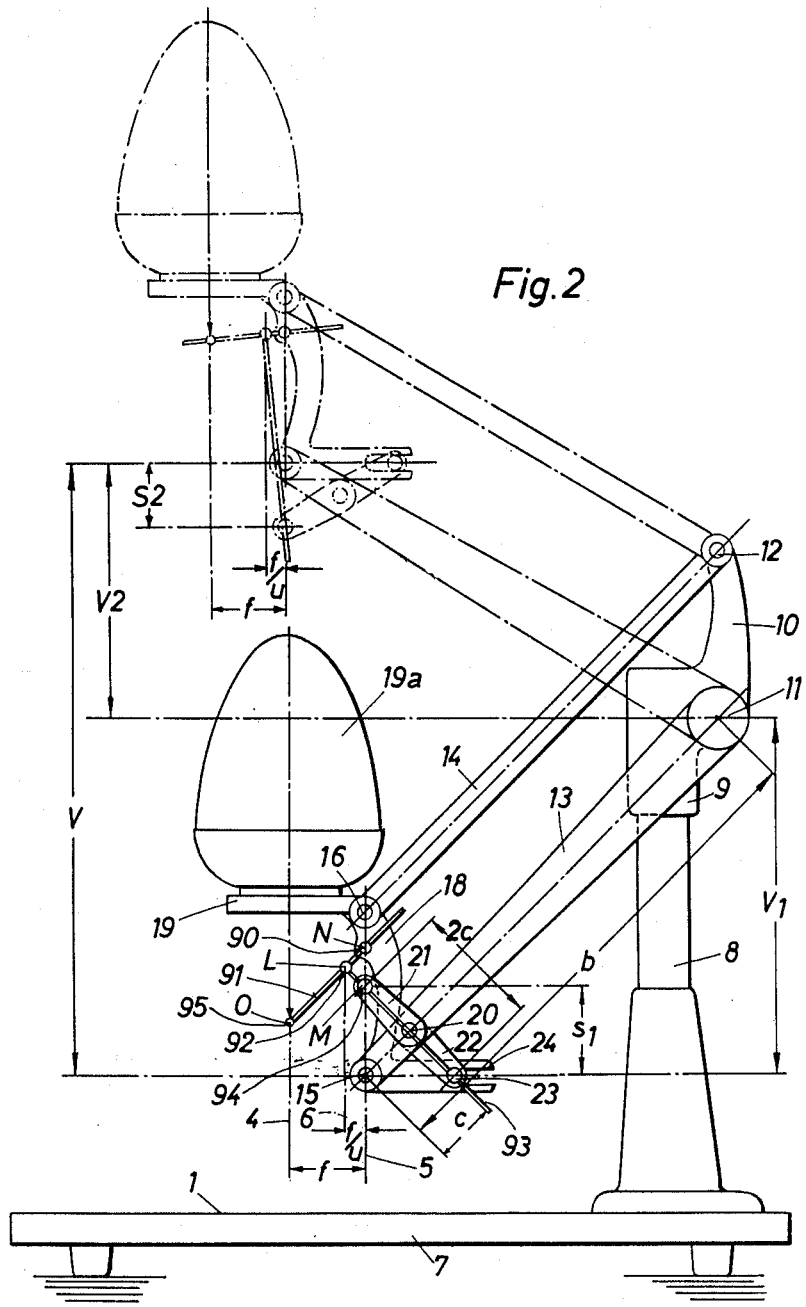
FIG. 2 illustrates one type of enlarger to which the structure of the invention is applied.

The application of the structure of the invention to one type of enlarger is illustrated in FIG. 2. The enlarger of FIG. 2 includes a base plate 7 the upper surface of which forms the stationary carrier 1 where the positive is located. The base plate 7 carries a column 8 on which a sleeve 9 is mounted, this sleeve 9 being, if desired, adjustable, and the sleeve 9 has a rigid arm portion 10 to which a pair of parallel arms 13 and 14 are respectively connected pivotally at 11 and 12. At their ends distant from the arm 10 the arms 13 and 14 are pivotally connected at 15 and 16, respectively, to the intermediate arm of a substantially Z-shaped element 18 which has an upper portion which forms the movable carrier 19 which is adapted to support the negative, transparency, or the like and which carries the lamp housing 19a. Thus, the portion of the element 18 which extends between the arms 13 and 14 together with the arm 10 and the arms 13 and 14 forms a parallelogram linkage so that the movable carrier 19 will not tilt while having its elevation changed by this parallelogram linkage which can be moved manually in a well known manner and which can be releasably fixed so as to maintain the movable carrier 19 at any desired elevation with respect to the stationary carrier 1. The arms 13 and 14 have a length $b$. At a distance $c$ from the pivot 15 a two-armed lever is connected to the arm 13, this two-armed lever having an intermediate pivot portion 20 which extends through an opening of the arm 13 and having at the opposite ends of the pivot portion 20 fixed thereto and respectively located on the opposite sides of the arm 13 a pair of arms 21 and 22. Thus, the arm 21 is located in front of the arm 13, as viewed in FIG. 2, while the arm 22 is located behind the arm 13, and these arms together with the pin 20 are turnable about the axis of the pin 20 which extends perpendicular to the optical axis, and the turning axis of the pin 20 is spaced from the axis provided by the bearing 15 by the distance $c$. The arm 22 which is behind the arm 13 of the parallelogram linkage extends between this arm 13 and the Z-shaped element 18. The arms 21 and 22 have equal lengths, and these lengths are equal to the distance $c$, as is indicated by the distance $2c$ shown in FIG. 2. The drive means M which may be in the form of a pin 94 is located at the free end of the lever arm 21, and the pin 94 which forms the drive means M is freely turnable with respect to the arm 21. The free end of the arm 22 carries a pin 23 which extends into a horizontal cutout 24 formed in the lower arm of the Z-shaped element 18, this cutout 24 extending horizontally, as indicated in FIG. 2.

The rotary pin 94 which forms the drive means M and which is carried by the arm 21 is formed with a bore passing transversely therethrough, and an elongated rod 93, which corresponds to the arm $J_3$ of FIG. 1, extends slidably through this bore so as to be slidable with respect to the pin 94. At its upper end the rod 93 is fixed to a pin 92 which is formed with a transverse bore, through which a rod 91 freely passes so that the rod 91 can freely slide through the pin 92 which is fixed to the free end of the rod 93, and the bore of the pin 92 through which the rod 91 passes maintains the rods 91 and 93 at all times perpendicular to each other, as illustrated in FIG. 2. At its left end, as viewed in FIG. 2, the rod 91 is connected with the objective means O, while to the right of the pin 92 the rod 91 passes freely through a bore formed in a pin 90 which forms the bearing N. This pin 90 is supported for free rotary movement by a portion of the element 18 which is adjacent the movable carrier means 19, so that the location of the bearing N with respect to the movable carrier means 19 is fixed. The parts are shown in solid lines where the arms 13 and 14 extend at an angle of 45° with respect to the optical axis and where the enlarger will provide a 1:1 enlargement ratio, and the dot-dash line position where they will provide the maximum degree of enlargement. As the parts move in this way the rod 91 slides freely through the pin 90 and also through the pin 92, and in addition the pin 94 slides freely along the rod 93. It will be seen that with this arrangement the drive means M formed by the pin 94 will remain at all times along the line 5 which passes through the bearing means N as well as through the pivot 15. The bearing means N provides a turning axis for the substantially T-shaped lever 91, 93, and this turning axis of the pin 90 extends normal to the plane of FIG. 2 which includes the optical axis 4, and it will be noted that with the structure illustrated the distance between the lines 4 and 5 is equal to the focal length $f$.

The parts shown in FIG. 2 will start from an intermediate position where the arm 13 extends horizontally. In moving downwardly from this intermediate position the pivotal connection 15 will move through the distance $v_1$, while the drive means M will only move through the distance $s_1$, and in moving upwardly from this intermediate position the pivotal connection 15 will move through the distance $v_2$, while the drive means M in this case will move only through the distance $s_2$. Of course, the distance $v_1$ and $v_2$ through which the pivotal connection 15 moves are the same as the distances through which the negative carrier 19 moves. In other words the total distance $v$ through which the pivotal connection 15 moves between the end position of the enlarger of FIG. 2 is equal to the total distance through which the movable carrier 19 moves, and it is apparent that the sum of the distances $s_1$ and $s_2$ is much smaller. Thus, the connection of the drive means M to the parallelogram linkage in the above-described manner through the lever 20–22 provides a step-down transmission, and the transmission ratio $u$ equals $b/2c$. In the illustrated example this ratio $u$ is equal to 4, and the same is true of all of the embodiments of the invention described below, with the exception of the embodiment of FIG. 10. Thus, the distance of the line 6 along which the intersection L moves from the line 5 has with respect to the focal length $f$ the same relationship as the transmission ratio and thus the distance between the lines 5 and 6 is $f/u$, as indicated. It will be noted that the drive means M remains at all times in the straight line 5 which is spaced from the optical axis 4 by the focal length $f$ of the objective O. Instead of a lever arrangement which forms a parallelogram linkage to provide the moving means for moving the movable carrier means 19 with respect to the stationary carrier means 1, as indicated in FIG. 2, it is possible to provide other drives such as planetary drives to form the moving means, and it is clear that the lever arrangement 20–22 is connected to the moving means 10–18 of FIG. 2 in such a way as to be actuated by movement of the moving means and to provide the step-down transmission ratio which reduces the distance through which the drive means M is moved.

Figure 3:
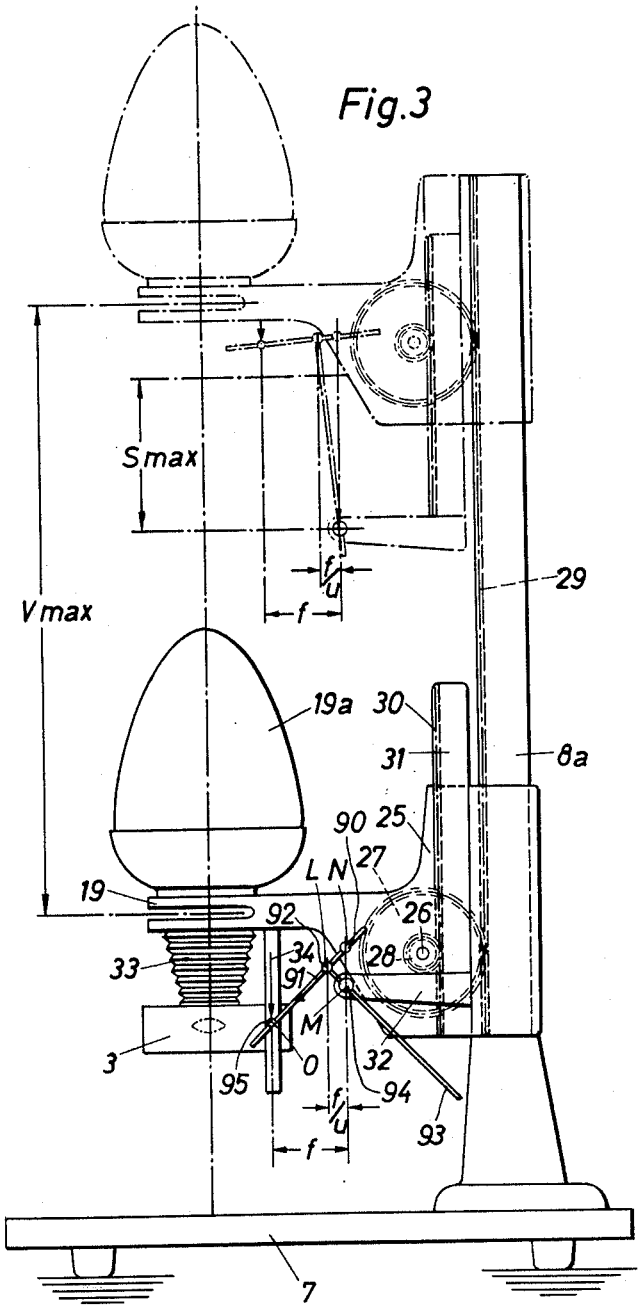
FIG. 3 illustrates another type of enlarger to which the structure of the invention is applied.

In the embodiment of the invention which is illustrated in FIG. 3 the movable carrier 19 for the negative, transparency, or the like is carried by a carriage means 25 which is vertically movable along a vertical column $8a$ which is carried by the base 7 the upper surface of which forms the stationary carrier means. The carriage 25 turnably carries a shaft 26 which in turn fixedly carries a gear 27 and a pinion 28, so that the gear and pinion are coaxial and fixed to each other for rotation together. The gear 27 meshes with a rack 29 which is fixed to and extends along the column $8a$ and which may be integral therewith, for example, while the pinion 28 meshes with a rack 30 which forms part of a second carriage 31 which is slidably guided by the first carriage 25 for vertical movement with respect thereto, and it will be noted that the carriage 25 moves parallel to the optical axis while the carriage 31 moves with respect to the carriage 25 also in a direction parallel to the optical axis. The second movable carriage 31 is provided with a horizontally extending arm which is fixed to the carriage 31 and which at its outer end carries the drive means M formed by pin 94 which is freely turnable with respect to the arm 32, and in the same way as in the embodiment of FIG. 2 a rod 93 extends freely through a transverse bore of the pin 94 and is fixed at its upper free end to a second pin 92 formed with a transverse bore through which the rod 91 freely passes, this rod 91 freely passing also through a transverse bore formed in a rotary pin 90 which forms the bearing N and which is fixedly carried by the movable carrier means 19 in the sense that the pin 90 moves at all times with and has a fixed location with respect to the movable carrier means 19 while at the same time the pin 90 can of course turn about the axis provided by the bearing means N, this axis extending perpendicular to the plane of FIG. 3 which includes the optical axis. The rod 91 extends also freely through a transverse bore formed in a pin 95 which forms part of the objective means O, this pin 95 being guided in a suitable vertical slot or the like formed in a guide 34 which is fixed to the movable carrier 19. The objective means includes the assembly 3 to which the pin 95 is fixed, and the assembly 3 is itself connected with the movable carrier 19 for movement with respect thereto by a bellows 33. The pitch circle diameter of the gear 27 is $u$ times as great as the pitch circle diameter of the pinion 28, so that the elements 27 and 28 together with the racks meshing respectively therewith provide a step-down transmission having the transmission ratio $u$. Thus, with this embodiment the carriage means 25 provides a moving means for moving the movable carrier 19 with respect to the stationary carrier, and in response to movement of the movable carrier means the step-down transmission moves the drive means M along a line which at all times remains parallel to the optical axis and which is spaced therefrom by the distance $f$ equal to the focal length of the objective, and with this construction it is clear that the results discussed above will be produced. As is shown in FIG. 3 the intersection L between the rods 91 and 93 will at all times be located along a straight line which is located between the optical axis and the straight line which passes through the bearing N and the drive means M and which is located from the latter straight line by a distance which has with respect to the focal length $f$ the ratio $u$. The total range of movement of the movable carrier means 19 is $v_{max}$, while the total range of movement of the drive means M is $s_{max}$, indicated in FIG. 3. In order to control the carriages it is possible to use any other suitable drives, such as for example, chain or belt drives.

In the embodiment of FIG. 4 the drive means M includes a roller 41 and is moved by a step-down transmission and parallelogram linkage as shown in FIG. 2 or by a step-down transmission and moving means as indicated in FIG. 3, the movable carrier 19 of FIG. 4 also being moved either by the structure of FIG. 2 or FIG. 3, and in FIG. 4 is also indicated an objective assembly 3 which forms part of the objective means O which includes the roller 40. The bearing means N is connected with the movable carrier means 19 by way of a roller 35 which is freely turnable about the bearing axis provided by the bearing means N, this bearing axis extending perpendicularly to the plane of FIG. 4 which includes the optical axis passing vertically through the objective means O. A wall of the objective assembly 3 is formed with a slot 37 which is inclined by an angle of 45° with respect to the optical axis, and a slide member 36 is longitudinally slidable along the slot 37. The focal length $f$ between the optical axis and a straight line passing through the axis of the bearing means N and the drive means M is indicated in FIG. 4. The slide member 36 can be releasably fixed in any suitable way at a selected position along the slot 37, and the slide member 36 carries a pointer 38 which cooperates with a correction scale 39 carried by the assembly 3 at an exterior surface thereof. The roller 40 which forms part of the objective means O has its axis located along the line $J_1$ which interconnects the objective means and the turning axis provided by the bearing means N in the plane which includes the optical axis, as indicated in FIG. 4. The line $J_3$ extends through the drive means M perpendicularly to the line $J_1$ and intersects the latter line at the point L. Through the above-described moving means and transmission means of either FIG. 2 or FIG. 3 the drive means M is capable of being moved along a line parallel to the optical axis through the distance $s_{max}$ shown in FIG. 4.

The lever means of FIG. 4 is also of a substantially T-shaped configuration and is formed by the lever 42 which has a cross-bar portion provided with a guide edge 47 extending parallel to the line $J_1$ and serving to guide the roller 40. The lever 42 has a leg portion provided with a guide edge 48 extending parallel to the line $J_3$ and the roller 41 of the drive means M bears against the edge 48. At the intersection L between the lines $J_1$ and $J_3$ the substantially T-shaped lever 42 turnably carries a roller 45, and this roller 45 engages a vertically extending guide surface 46, so that in this way the intersection L is at all times maintained along a line extending parallel to the optical axis between the optical axis and the straight line along which the drive means M moves. The guide edge 46 for the roller 45 forms part of a slide member 54 which serves a purpose described below. At its right end, as viewed in FIG. 4, the cross-bar portion of the lever 42 is formed with an elongated cutout in its free end portion 49, and this cutout provides a guide edge 50 which is aligned with the guide edge 47 and which is engaged by the roller 35 of the bearing means N. Thus, the guide edge 50 is also parallel to the line $J_1$ and is located at the same distance therefrom as the guide edge 47. During movement of the drive means M downwardly from the solid-line position indicated in FIG. 4 along the line 51 to the lowest dotted-line position indicated in FIG. 4, this latter position being the position where the greatest degree of enlargement is provided, the roller 45 moves along the guide edge 46 upwardly and the lever means 42 turns about the turning axis provided by the bearing means N. Thus, as the result of the guide 34 shown in FIG. 3 the objective moves along the optical axis and its roller 40 and the guide edge 47 move one with respect to the other, the objective means O moving along the line indicated by the double-headed arrow 52, and of course the line 51 is also illustrated as a double-headed arrow along which the drive means M is movable. Thus, the intersection L moves along the line 52a indicated as a double-headed arrow and the distance NL has at all times with respect to the distance NO the ratio $1/u$. Thus, this construction will produce the results described above.

In order to change the focal length, the objective means O must move along the line 53 having a double-headed arrow at an angle of 45° to the optical axis, and also the guide edge 46 must move in a direction perpendicular to the optical axis. For this purpose the slide member 54 which carries the guide edge 46 is slidable with respect to a scale 55 and can be fixed with respect to this scale through any suitable slot and screw connection 57. Fixed to the movable carrier means 19 is a guide edge 56 along which the slide 54 is movable. Thus, in order to change the focal length, as when changing one objective means for another, it is only necessary to make two adjustments. An index 58 is provided to indicate the position of the slide member 54 with respect to the scale 55. In order to provide an arrangement where the two adjustments can be made in an extremely simple manner the guide edge 56 for the slide member 54 is arranged so as to make an angle $\beta$ with the optical axis, and this angle $\beta$, as is explained below, is the arc sin $1/u \cdot \sqrt{2}$. With this construction it is possible to make the graduations of the scale 39 and the graduations of the scale 55 identical.

FIG. 4a illustrates diagrammatically the structure of FIG. 4 with all of the parts shown in FIG. 4 in the same position in which they have in FIG. 4. The parts are also shown diagrammatically in FIG. 4b, FIG. 4b illustrating how the position of the elements change for another objective of a different focal length. The objective has been changed so that the objective of FIG. 4b has a focal length $(f-d)$ which is $d$ smaller than the focal length $f$. Thus, the objective means O must be moved by a distance $d$ to the right toward the line 51, so that this latter line along which the drive means M moves will now still remain at the focal length a distance from the new objective. Also, in order to maintain the enlargement ratio 1:1 at one end position of the enlarger the objective means must be moved vertically by the distance $d$. This adjustment vertically by the distance $d$ and horizontally by the distance $d$ of the objective means is brought about by loosening the slide 36 and providing a movement of the objective means in the direction of the double-headed arrow 33 by a distance $d\sqrt{2}$. Thus, referring to FIG. 4b, the objective means moves, with respect to the bearing means N, from the position $O_0$ to the position $Z_d$ and at the same time any reference point on the objective means or objective assembly has moved from $Z_z$ to $O_o$, by a distance $2d$. Thus, the distance of the objective means from the negative carrier 2 has decreased by the distance $2d$ to the distance $2(f-d)$. At the same time the intersection L is moved by a distance $d/u$ further to the right so that between N and L there will be the horizontal distance $f-d/u$. Inasmuch as the guide 46 for the roller 45 is carried by the slide member 54, this member 54 must move to the right by the distance $d/u$ and also it must move in a direction along the double-headed arrow 57 by a distance $d\sqrt{2}$, so that the same degree of adjustment will be provided for the objective means O and for the slide 54.

This adjustment in these two directions corresponds to a construction where the sin $\beta$ is equal to $$\frac{d/u}{d.\sqrt{2}} = \frac{1}{u.\sqrt{2}}, \text{ so that } \beta = \text{arc sin } \frac{1}{u.\sqrt{2}}$$

Another embodiment of the invention, which makes it possible to eliminate the guide edge or guide means 46, is illustrated in FIGS. 5–7, and a simplified, schematic illustration is shown in FIG. 5a referred to below. As is apparent from FIG. 5, the embodiment illustrated therein also includes a substantially T-shaped lever means, and this lever means includes a T-shaped member 59 provided with a guide edge 48 to be engaged by the drive means M in the form of a roller 41, as described above in connection with FIG. 4. The lever means of this embodiment includes in addition to the T-shaped member 59 a member 60 which extends along the crossbar portion of the member 59 and which is freely shiftable with respect thereto in a direction parallel to the line $J_1$. This slide member 60 is formed with an elongated slot 68 providing an elongated guide edge 50a, and the slide member 60 is shiftable with respect to the member 59 as a result of pin-and-slot connections therewith. Thus, the member 59 carries a pin 64 extending through a slot 62 formed with a slot member 60, while the slide member 60 carries a pin 63 slidable in an elongated slot 61 of the member 59, and these slots 61 and 62 extend parallel to the line $J_1$. Thus, the slide member 60 can be shifted in a direction perpendicular to the edge 48. The bearing means N which is fixed to the movable carrier 19 has, as shown most clearly in FIG. 6, a rotary shaft 65 which is fixedly connected with a pinion 66 as well as a gear 67 which are coaxial with each other and with the shaft 65 to which they are fixed. The hub 67a of the gear 67 slidably engages the guide edge 50a. A spring means is formed by an elongated spring 71 which is connected at one end to a pin 69 carried by the member 59 and at its opposite end to a pin 70 carried by the slide member 60, so that in this way the slide member 60 and the member 59 are urged to slide with respect to each other in a direction which moves the pin 63 and the left end of the slot 61 toward each other. The member 59 fixedly carries a rack 72 which meshes with the pinion 66, while a pair of pins 70 and 73 fix to the slide member 60 a rack 74 which meshes with the gear 67, and these racks of course extend parallel to the line $J_1$. The objective means O includes here also a roller 40, and the slide member 60 is formed with a claw portion 75 which receives the roller 40. Thus, the spring 71 on the one hand urges the member 59 upwardly to maintain the edge 48 in engagement with the roller 41 of the drive means M which is moved by a moving means and transmission means in the manner described above in connection with FIG. 2 or FIG. 3, and at the same time the spring 71 maintains the slide member 60 in engagement with the objective means O at the roller 40 thereof in the manner shown in FIG. 5. With this embodiment, as was the case with the above-described embodiments, as the roller 41 moves downwardly the lever 59 will turn so as to raise the objective means O, and all of the above-described operations will take place in the same way. It will be noted that the line $J_1$ which interconnects the bearing means N and the objective means O is perpendicular to the line $J_3$ which is parallel to the guide edge 48 and which intersects the line $J_1$ at L. During the upward movement of the objective means O in this manner, it is clear that since the turning axis provided by the bearing means N remains along the straight line along which the drive means M moves and since the objective means O remains along the optical axis which is parallel to the latter straight line, then the distance NO becomes shorter, and as a result the slide 60 is moved by the objective means to the right, with respect to the member 59, and this movement causes the rack 74 to turn the gear 67 which through turning the pinion 66 causes the rack 72 and the member 59 itself to shift. The transmission ratio provided by gear 67 and the pinion 66 is equal to $1/u$, so that the intersection L remains at all times without any guide along the straight line 6 which is located between and which is parallel to the optical axis and the straight line along which the drive means M moves and which of course is spaced from the straight line along which the drive means M moves by a distance which makes with the focal length $f$ the same ratio $u$. Therefore, with this construction when an objective of one focal length is exchanged for an objective of a different focal length it is only necessary to adjust the objective along the path indicated by the double-headed arrow 53 in FIG. 5, and the location of the intersection L will automatically be located in the proper position between the straight line along which the drive means M moves and the new location of the optical axis.

While it is possible to provide in the slide 60 an opening which receives the roller 40 of the objective means O, which is perhaps desirable where the objective cannot be changed to provide an objective of a different focal length, it is preferred to use the claw portion 75 since in most constructions the objective can be changed and thus this construction where a claw 75 is provided makes such a change much easier to carry out. It is only necessary to introduce the roller 40 of the new objective into the claw portion 75 and the spring 71 then maintains the parts operatively connected to each other.

Referring to FIG. 5a, the function of the structure described above and shown in FIGS. 5–7 is illustrated diagrammatically. The elements $J_1$, and $J_3$, are to be considered as bars which are provided with the racks 74 and 59. The element $J_1$, has the claw portion 75 which receives the objective means O and is axially shiftable with respect to the bearing means N. Moreover, the rack 59 of the element $J_3$, is slidable longitudinally of the element $J_1$, as a result of the slidable supports 59' and 59''. The pinion 66 which is turnably supported by the bearing means N meshes with the rack 59 and the gear 67 which is fixed coaxially to this pinion is with the rack 74. With this arrangement also a spring is provided to maintain the claw 75 in engagement with the objective means O.

When the drive means M which engages the member $J_3$, moves downwardly along the path indicated by the double-headed arrow 52b, then the member $J_1$, will turn in a clockwise direction, as viewed in FIG. 5a, and since the objective means O is constrained to move vertically the distance ON becomes shorter and thus the element $J_1$, shifts to the right, as viewed in FIG. 5a with respect to the element $J_3$, thus causing the rack 74 to turn the gear 67 in a counterclockwise direction, as viewed in FIG. 5a. The pinion 66 turns with the gear 67 and thus acts on the rack 59 to shift the latter and the member $J_3$, by way of the slidable bearings 59' and 59'' with respect to the member $J_1$, and the transmission ratio is $1/u$ so that the intersection L remains at a constant horizontal distance $f/u$ from the vertical path along which the drive means M moves. The distance ON is thus automatically sensed with this construction, and where there is a change in the focal length the new position of the intersection L is provided simply by the new position of the objective means O provided by the shifting of the latter in the direction of the double-headed arrow 53.

The claw portion 75a of the embodiment of FIG. 8, which is shown also diagrammatically in FIG. 8a, is located at the free end of a lever 76 which forms part of a toggle linkage. The other lever of the toggle linkage is the lever 78 which is pivotally connected at 77 to the lever 76 and which is pivotally connected to the bearing means N for turning movement about the turning axis provided by the bearing means N, this turning axis of course being normal to the plane of FIG. 8 which includes the optical axis along which the objective means O moves, and of course the drive means M which also may include the roller 41 moves along a line parallel to the optical axis and spaced therefrom by the focal length $f$ of the objective means, as is indicated in FIGS. 8 and 8a, this drive means M being moved in this case also through the transmission means of FIGS. 2 or 3, and of course the movable carrier means of this embodiment is also moved either with the structure of FIG. 2 or that of FIG. 3. The length of the lever 78 of the toggle linkage of FIG. 8 is indicated at $a$, and the lever 76 has a portion of equal length extending between the objective means O and the pivotal connection 77, while this lever 76 has a free end portion 76a extending beyond the connection of the lever 76 at 77 to the lever 78. As is shown in FIG. 9, the bearing means N provides a pivot 79 for the lever 78 of the lever means of the embodiment of FIG. 8, and at a distance $2a/u$ from the bearing means N along the lever 78 there is pivotally connected to this lever at 81 an elongated bar 80 which is of a substantially Z-shaped cross section, as shown in FIG. 9. The bar 80 extends along the line $J_3$ and on one side of its central web portion is located the roller 41 in engagement with the flanged edge portion 80a of the bar 80. A roller 82 engages the other flanged edge portion 80b of the bar 80 and is located on the side of the central web portion thereof opposite from the roller 41, and this roller 80b is turnably carried by the free end portion 76a of the lever 76 at its outer extremity. The distance between the pivot 81 and the pivot 77 is $a-2a/u$, and the distance between pivot 77 and the axis of the roller 82 is also $a-2a/u$, so that in addition to the toggle linkage provided by the interconnection between the levers 76 and 78 there is a second toggle linkage. It will be noted that the legs of the second toggle linkage have an equal length, and of course the toggle linkage provided by the levers 76 and 78 have the legs which are of an equal length $a$. Thus, with this embodiment also the line $J_3$ along which the bar 80 extends will at all times be perpendicular to the line $J_1$ which interconnects the bearing means N and the objective means O, and these lines intersect at L which divides the distance ON by the ratio $1:u$. Therefore, with this embodiment also the intersection L will remain at all times along the straight line 6 which is parallel to and located between the optical axis and the straight line along which the drive means M moves and which is spaced from this latter straight line by a distance which makes with respect to the focal length $f$ a ratio $u$.

The two end positions of the lever means of FIG. 8 are indicated in solid and dot-dash lines. In order to change the focal length when exchanging one objective means for another, it is only necessary, as was the case with FIG. 5, to place the roller 40 of the new objective in engagement with the claw portion 75a. A suitable spring is provided to maintain the claw portion 75a in engagement with the roller 40, this spring extending for example between and being connected to the bearing means N and the roller 82, and for the sake of clarity such a spring is not shown. The above-described structure of FIG. 8 provides the particular advantage of requiring only three relatively simple elongated members and in addition to only two slidable connections only simple pivotal connections, so that the greatest degree of accuracy and reliability in operation is guaranteed.

The structure of FIGS. 8 and 9 is shown schematically in FIG. 8a which illustrates the operation in a clearer manner. In FIG. 8a the drive means M and the roller 82 are illustrated diagrammatically as having a slidable engagement with an elongated rail 80 which corresponds to the bar 80. It is apparent that the rail or bar 80 will extend at all times along a straight line which is perpendicular to the line $J_1$ which interconnects the bearing means N and the objective means O. During movement of the drive means M along the line indicated by the double-headed arrow 52b the intersection L, which is only imaginary and which does not form any concrete element in this embodiment, will move along the line indicated by the double-headed arrow 52a and will thus remain, for the focal length $f$, at all times at the distance $f/u$ from the straight line along which the drive means M moves, this latter straight line moving through the bearing means N. This distance of the line along which the intersection L moves with respect to the optical axis and the straight line along which the drive means M moves changes itself automatically when the position of the objective means O is adjusted along the line indicated by the double-headed arrow 53 in order to accommodate an objective means of a different focal length.

With the embodiment of the invention which is illustrated in FIG. 10, a parallelogram linkage is provided by a first pair of levers 76' and 76" which are pivotally connected to and extend from the objective means O toward the straight line along which the drive means M moves, and by a second pair of levers 78' and 78" pivotally connected to the bearing means N for turning movement about the turning axis provided by the bearing means N, all of these levers being of equal lengths and the levers 76' and 78" being pivotally connected respectively to the levers 78' and 76" at the pivotal connections 82' and 81', so that this parallelogram linkage also provides a pair of toggle linkages which forms the lever means of the embodiment of FIG. 10. The roller or slide member which corresponds to element 82 of FIGS. 8 and 8a is located at 82' at the pivotal connection between the lever 76' and 78' and cooperates with the elongated bar 80 in the manner described above in connection with FIGS. 8 and 8a, while the free end of the bar 80 is pivotally connected at 81' to the pivotal connection between the lever 76" and 78". As a result, this bar 80 due to its slidable connection at 82' and its pivotal connection at 81' with this lever means formed by the pair of toggle linkages 76' and 78' and 76", 78" will remain at all times perpendicular to the line $J_1$ which interconnects the bearing means N and the objective means O, the bar 80 of course extending along the line $J_3$. Inasmuch as the connections 81' and 82' between the lever means and the bar 80 coincide with the pivots of the pair of toggle linkages, the structure shown in solid lines in FIG. 10 provides an arrangement where the ratio $u$ is 2, and of course with such an embodiment the structure of FIG. 2 or the structure of FIG. 3 would be modified so as to provide a step-down transmission of 2. In order to maintain the ratio where $u$ is 4, as in the embodiments described above, the bar 80 is pivotally connected at $81_1'$ to the lever 78" between and equidistant from the ends thereof and is slidably connected at $82_1$, to the lever 78' midway between its ends. To provide a ratio $u$ which is equal to 3, the bar 80 would be pivotally connected at $81_2$, to the lever 78" between the ends thereof located threee quarters of the way along the lever 78" from the bearing means N to the pivotal connection 81' between the levers 78" and 76", and the bar 80 would be slidably connected at $82_2$, to the lever 78' at the same distance along this lever 78' from the bearing means N as the pivotal connection $81_2$, is located along the lever 78" from the bearing means N. In a similar way, it is possible to provide a ratio $u=4/3$ by pivotally connecting the bar 80 to the lever 76" at $81_3$, midway between the ends of the lever 76" and by slidably connecting the bar 80 to the lever 76' at $82_3$, midway between the ends of the lever 76'. The corresponding distances of the inersections $L_1$, $L_2$, $L_3$ are respectively indicated at $f/u_1$, $f/u_2$, and $f/u_3$. Moreover, the positions of the drive means M which will provide an enlargement ratio of 1:1 with these different arrangements are respectively indicated $M_1$, $M_2$, and $M_3$. This construction which is shown in FIG. 10 provides the particular advantage of providing a particularly reliable control when the ratio $u$ is 2, since with this construction the lever arm of the bar 80 with respect to the toggle lever arrangement is infinitesimally small. However, with such a construction there is the greatest distance between the pivotal connections 81' and 82'.

It will be understood that each of the elements described above, or two or more together, may also find a useful application in other types of enlargers and the like differing from the types described above.

While the invention has been illustrated and described as embodied in structure for adjusting enlargers and the like, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic enlarger, copier, or the like, in combination, objective means having an optical axis and being movable therealong; bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; and lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line.

2. In a photographic enlarger, copier, or the like, in combination, objective means having an optical axis and being movable therealong; bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; and lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line, said lever means moving said objective means along said optical axis in a direction opposite to the direction of movement of said drive means along said first straight line with respect to said bearing means.

3. In a photographic enlarger, copier, or the like, in combination, objective means having an optical axis and being movable therealong; carrier means located along said optical axis for carrying a negative, transparency, or the like the image of which is to be reproduced; bearing means stationary with respect to said carrier means, said bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; and lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line.

4. In a photographic enlarger, copier, or the like, in combination, objective means having an optical axis and being movable therealong; carrier means located along said optical axis for carrying a negative, transparency, or the like the image of which is to be reproduced; bearing means stationary with respect to said carrier means, said bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; and substantially T-shaped lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line, said substantially T-shaped lever means having a cross-bar portion which extends along said second straight line and a leg portion which extends along said third straight line, and the intersection between said cross-bar portion and leg portion being located at all times in said fourth straight line.

5. In a photographic enlarger, copier, or the like, in combination, objective means having an optical axis and being movable therealong; carrier means located along said optical axis for carrying a negative, transparency, or the like the image of which is to be reproduced; bearing means stationary with respect to said carrier means, said bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; and lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line, said lever means including a toggle linkage.

6. In a photographic enlarger, copier, or the like, in combination, objective means having an optical axis and being movable therealong; carrier means located along said optical axis for carrying a negative, transparency, or the like the image of which is to be reproduced; bearing means stationary with respect to said carrier means, said bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line; and means cooperating with said lever means and objective means for adjusting the relation therebetween when an objective means of one focal length is exchanged for an objective means of a different focal length.

7. In a photographic enlarger, copier, or the like, in combination, objective means having an optical axis and being movable therealong; bearing means providing a turning axis perpendicular to a plane which includes said optical axis and spaced therefrom by a distance equal to the focal length of said objective means; drive means movable and located at all times along a first straight line, in said plane, parallel to said optical axis and intersecting said turning axis; lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line; a pair of carrier means respectively located on opposite sides of said objective means along said optical axis, one of said carrier means being adapted to carry a positive which is to be provided with a reproduction and the other of said carrier means being adapted to carry a negative or the like the image of which is to be reproduced; moving means carried by said one carrier means and operatively connected to said other carrier means for moving said other carrier means along said optical axis with respect to said one carrier means, so that said moving means regulates the distance between said pair of carrier means, said objective means being operatively connected to said other carrier means for movement with respect thereto along the optical axis; step-down transmission means actuated by said moving means and operatively connected to said drive means for moving the same along said first straight line through a distance which is a predetermined fraction of the distance through which said other carrier means is moved by said moving means, said fourth straight line being located from said first straight line by a distance which has with respect to said focal length a ratio equal to said fraction.

8. In a photographic enlarger, copier, or the like, in combination, objective means having an optical axis and being movable therealong; stationary carrier means located along said optical axis on one side of said objective means for carrying a positive or the like which is to receive a reproduction; movable carrier means located along said optical axis on the other side of said objective means for carrying a negative, transparency, or the like the image of which is to be reproduced; bearing means carried by and having a fixed relation with respect to said movable carrier means, said bearing means providing a turning axis perpendicular to a plane which includes said optical axis and spaced therefrom by a distance equal to the focal length of said objective means; drive means movable and located at all times along a first straight line, in said plane, parallel to said optical axis and intersecting said turning axis; lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line; moving means carried by said stationary carrier means and operatively connected to said movable carrier means for moving the latter along said optical axis with respect to said stationary carrier means; and step-down transmission means actuated by said moving means and operatively connected to said drive means for moving the latter along said first straight line through a distance which is a predetermined fraction of the distance through which said moving means moves said movable carrier means along said optical axis, said fourth straight line being spaced from said first straight line by a distance which has with respect to said focal length a ratio equal to said fraction.

9. In a photographic enlarger, copier, or the like, in combination, objective means having an optical axis and being movable therealong; stationary carrier means located along said optical axis on one side of said objective means for carrying a positive or the like which is to receive a reproduction; movable carrier means located along said optical axis on the other side of said objective means for carrying a negative, transparency, or the like the image of which is to be reproduced; bearing means carried by and having a fixed relation with respect to said movable carrier means, said bearing means providing a turning axis perpendicular to a plane which includes said optical axis and spaced therefrom by a distance equal to the focal length of said objective means; drive means movable and located at all times along a first straight line, in said plane, parallel to said optical axis and intersecting said turning axis; lever means operatively connected with said objective means, bearing means and drive means for turning about said turning axis and moving said objective means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and first straight line; moving means carried by said stationary carrier means and operatively connected to said movable carrier means for moving the latter along said optical axis with respect to said stationary carrier means; and step-down transmission means actuated by said moving means and operatively connected to said drive means for moving the latter along said first straight line through a distance which is a predetermined fraction of the distance through which said moving means moves said movable carrier means along said optical axis, said fourth straight line being spaced from said first straight line by a distance which has with respect to said focal length a ratio equal to said fraction, said lever means moving said objective means along said optical axis in a direction opposite to the direction in which said transmission means moves said drive means along said first straight line with respect to said bearing means.

10. In a photographic enlarger, copier, or the like, in combination, objective means having an optical axis and being movable therealong; stationary carrier means located on one side of said objective means along said optical axis for carrying a positive or the like on which a photographic reproduction is to be made; parallelogram linkage means carried by said stationary carrier means; movable carrier means located along said optical axis on the side of said objective means opposite from said stationary carrier means, said movable carrier means being adapted to carry a negative, transparency, or the like provided with an image which is to be reproduced, said movable carrier means being carried by said parallelogram linkage means, and said parallelogram linkage means displacing said movable carrier means with respect to said stationary carrier means along said optical axis, said objective means being connected to said movable carrier means for movement with the latter during actuation of said parallelogram linkage means as well as for movement with respect to said movable carrier means; bearing means carried by said movable carrier means and being fixed with respect thereto, said bearing means providing a turning axis perpendicular to a plane which includes said optical axis and spaced therefrom by a distance equal to the focal length of said objective means; drive means movable and located at all times along a first straight line, in said plane, parallel to said optical axis and intersecting said turning axis; lever means operatively connected with said objective means, bearing means, and drive means for turning about said turning axis and moving said objective means with respect to said movable carrier means along said optical axis in response to movement of said drive means along said first straight line, said lever means maintaining the intersection between a second straight line, in said plane and interconnecting said objective means and said turning axis, and a third straight line, also in said plane and perpendicular to said second straight line and passing through said drive means, at all times in a fourth straight line which is parallel to and located between said optical axis and said first straight line; and step-down transmission means operatively connected to said parallelogram linkage means and acting on said drive means for moving the latter along said first straight line during movement of said parallelogram linkage means through a fraction of the distance that said movable carrier means is moved along said optical axis by said parallelogram linkage means, said fourth straight line being spaced from said first straight line by a distance which has with respect to said focal length a ratio equal to said fraction.

11. In a photographic enlarger, copier, or the like, in combination, objective means having an optical axis and being movable therealong; stationary carrier means located along said optical axis on one side of said objective means and adapted to carry a positive or the like on which a photographic reproduction is to be made; a column parallel to said optical axis and carried by said stationary carrier means; first carriage means movable along said column in a direction parallel to said optical axis; movable carrier means located on the optical axis on the side of said objective means opposite from said stationary carrier means and adapted to carry a negative, transparency, or the like which provides an image which is to be reproduced, said movable carrier means being carried by said first carriage means for movement therewith, so that displacement of said first carriage means along said column displaces said movable carrier means with respect to said stationary carrier means along said optical axis, said objective means being connected to said movable carrier means for movement therewith in response to movement of said first carriage means along said column as well as for movement with respect to said movable carrier means; bearing means carried by said movable carrier means and having a fixed location with respect thereto, said bearing means providing a turning axis perpendicular to a plane which includes said optical axis and spaced therefrom by a distance equal to the focal length of said objective means; drive means movable and located at all times along a first straight line in said plane parallel to said optical axis and intersecting said turning axis; lever means operatively connected to said objective means, bearing means, and drive means for turning about said turning axis and moving said objective means with respect to said movable carrier means along said optical axis in response to movement of said drive means along said first straight line, said lever means maintaining the intersection between a second straight line, in said plane and interconnecting said objective means and turning axis, and a third straight line, also in said plane and perpendicular to said second straight line and passing through said drive means, at all times in a fourth straight line which is parallel to and located between said optical axis and said first straight line; second carriage means carried by said first carriage means for movement with respect thereto in a direction parallel to said optical axis, said second carriage means being operatively connected to said drive means for moving the latter along said first straight line; and step-down transmission means carried by said first carriage means and cooperating with said second carriage means for moving the latter and said drive means therewith through a fraction of the distance with respect to said movable carrier means and said first carrier means that said first carriage means and said movable carrier means move through during movement of said first carriage means along said column, said fourth straight line being spaced from said first straight line by a distance which has with respect to the focal length of said objective means a ratio equal to said fraction.

12. In a photographic enlarger, copier, or the like, in combination, objective means having an optical axis and being movable therealong, said objective means carrying a roller which is turnable about an axis perpendicular to said optical axis; bearing means providing a turning axis perpendicular to a plane which includes said optical axis and spaced therefrom by a distance equal to the focal length of said objective means, said bearing means also having a roller, and said roller of said bearing means being turnable about said turning axis of said bearing means; drive means; moving means operatively connected to said drive means for moving and locating said drive means at all times along a first straight line, in said plane, parallel to said optical axis and intersecting said turning axis of said bearing means, said drive means including a roller movable along said first straight line and having a turning axis parallel to said turning axis of said bearing means; a substantially T-shaped lever formed with an elongated cutout in which said roller of said bearing means is located and having a pair of mutually perpendicular guide edges respectively engaged by said rollers of said objective means and drive means, the guide edge of said lever which is engaged by said roller of said objective means being in alignment with an edge of said cutout which is engaged by said roller of said bearing means, said lever turning about the axis of said bearing means and moving said objective means along said optical axis in response to movement of said roller of said drive means along said first straight line while engaging the guide edge of said lever which is perpendicular to that edge which is engaged by said roller of said bearing means, said lever carrying a roller which is turnable about an axis parallel to the turning axis of said bearing means, and the axis of said roller which is carried by said lever means passing through the intersection between a second straight line, in said plane and interconnecting the axes of said rollers of said objective means and bearing means, and a third straight line also in said plane and perpendicular to said second straight line, said third straight line passing through the axes of said rollers of said lever and drive means; and guide means having a guide surface located between said optical axis and said first straight line and extending parallel to said optical axis, said guide surface engaging said roller of said lever means for maintaining the intersection of said second and third straight lines at all times in a fourth straight line parallel to said optical axis.

13. In a photographic enlarger, copier, or the like, as recited in claim 12, first adjusting means cooperating with said guide means for adjusting the latter perpendicularly with respect to said optical axis and first straight line so as to adjust the position of said fourth straight line between said optical axis and first straight line; and adjusting means operatively connected to said roller of said objective means for adjusting said objective means and said roller therewith along a line which makes a 45° angle with the optical axis.

14. In a photographic enlarger, copier, or the like as recited in claim 13, said guide means being adjusted by said first adjusting means along a line in said plane which makes with respect to the optical axis an angle equal to $1/\sqrt{2}$ times the fraction resulting from the distance of said fourth straight line from said first straight line with respect to the focal length of the object means, so that the same adjustments may be made with said first and second adjusting means when changing from the objective means of one focal length to an objective means of a different focal length.

15. In a photographic enlarger, copier, or the like, as recited in claim 1, said lever means including a first member of substantially T-shaped configuration having a cross-bar portion extending along said second straight line and a leg portion extending along said third straight line, and said lever means including an elongated second member extending along said cross-bar portion of said first member in the direction of said second straight line, said second member and said first member being shiftable with respect to each other in the direction of said second straight line, said second member engaging said objective means, so that when an objective means of one focal length is replaced by a second objective means of a second focal length and said second objective means is placed at a distance equal to its focal length from said first straight line said second member of said lever means will be shifted in the direction of said second straight line so that said first straight line will now be at said focal distance from the optical axis of said second objective means; and means operatively connected to said first and second members of said lever means for automatically shifting said first member along said second straight line with respect to said second member when the latter is moved by engaging the second objective means for maintaining said intersection between said second and third straight lines at a distance from said first straight line which makes with respect to the focal length of the second objective means the same ratio that the distance between said fourth and first straight lines made with respect to the focal length of the first objective means.

16. In a photographic enlarger, copier, or the like, as recited in claim 15, said second member of said lever means having a claw portion and each objective means including a roller engaged in said claw portion; and spring means operatively connected to said first and second members of said lever means for urging them to shift with respect to each other in a direction which maintains said claw portion in engagement with said roller.

17. In a photographic enlarger, copier, or the like, as recited in claim 15, said means for shifting said first member with respect to said second member including a pair of elongated racks respectively carried by said first and second members and extending parallel to said second straight line, a gear engaging the rack of said second member and a coaxial pinion engaging the rack of said first member, said gear and pinion being fixed to each other for rotation together and being connected to said bearing means for rotary movement about said turning axis, and the transmission ratio between said gear and pinion being equal to the ratio of the distance between said first and fourth straight lines with respect to the focal length.

18. In a photographic enlarger, copier, or the like, as recited in claim 1, said lever means including a toggle linkage having at least two arms respectively connected pivotally with said bearing means and objective means and pivotally connected to each other at equal distances from said bearing means and objective means, and said lever means including an elongated bar cooperating slidably with said drive means and pivotally connected to at least one of said arms intermediate its ends.

19. In a photographic enlarger, copier, or the like, in combination, objective means having an optical axis and being movable therealong; bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; a first lever pivotally connected at one end to said bearing means for turning movement around said turning axis thereof; a second lever pivotally connected to said objective means for turning movement with respect to the optical axis about an axis perpendicular thereto and parallel to said turning axis of said bearing means, said second lever being pivotally connected intermediate its ends to a portion of said first lever which is distant from said bearing means, and the lengths of the portions of said levers extending from their pivotal connection respectively to said bearing means and objective means being equal so that said levers cooperate to form a toggle linkage, said second lever having a portion of predetermined length extending beyond its pivotal connection to said first lever; an elongated bar pivotally connected to said first lever intermediate its ends at a distance along said first lever from the pivotal connection thereof to said second lever equal to the length of said portion of said second lever which extends beyond said first lever, and said elongated bar being slidably connected with the free end of said second lever which is located beyond said first lever, said bar extending perpendicularly with respect to a straight line located in said plane and interconnecting said turning axis of said bearing means and said objective means, whereby irrespective of the position of said bar during turning of said first lever about said turning axis of said bearing means and movement of said objective means along said optical axis, said bar will remain perpendicular to a straight line interconnecting said turning axis of said bearing means and said objective means, said bar also being in slidable engagement with said drive means for moving and turning said levers during movement of said drive means along said first straight line, and the intersection of the line interconnecting said turning axis of said bearing means and said objective means with a line extending along said bar remaining at all times along a fourth straight line which is located between said first straight line and said optical axis.

20. In a photographic enlarger, copier, or the like, in combination, objective means having an optical axis and being movable therealong; bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; a first lever pivotally connected to one end to said bearing means for turning movement around said turning axis thereof; a second lever pivotally connected to said objective means for turning movement with respect to the optical axis about an axis perpendicular thereto and parallel to said turning axis of said bearing means, said second lever being pivotally connected intermediate its ends to a portion of said first lever which is distant from said bearing means, and the lengths of the portions of said levers extending from their pivotal connection respectively to said bearing means and objective means being equal so that said levers cooperate to form a toggle linkage, said second lever having a portion of predetermined length extending beyond its pivotal connection to said first lever; an elongated bar pivotally connected to said first lever intermediate its ends at a distance along said first lever from the pivotal connection thereof to said second lever equal to the length of said portion of said second lever which extends beyond said first lever, and said elongated bar being slidably connected with the free end of said second lever which is located beyond said first lever, said bar extending perpendicularly with respect to a straight line located in said plane and interconnecting said turning axis of said bearing means and said objective means, whereby irrespective of the position of said bar during turning of said first lever about said turning axis of said bearing means and movement of said objective means along said optical axis, said bar will remain perpendicular to a straight line interconnecting said turning axis of said bearing means and said objective means, said bar also being in slidable engagement with said drive means for moving and turning said levers during movement of said drive means along said first straight line, and the intersection of the line interconnecting said turning axis of said bearing means and said objective means with a line extending along said bar remaining at all times along a fourth straight line which is located between said first straight line and said optical axis, said bar being of substantially Z-shaped cross section and having an elongated central web portion and a pair of opposed flanged edge portions extending in opposite directions from the edges of said central web portion, said drive means including a roller located on one side of said central web portion in engagement with one of said flanged edge portions and the free end of said first lever carrying a roller on the other side of said central web portion and engaging the other flanged edge portion of said bar.

21. In a photographic enlarger, copier, or the like, in combination, objective means having an optical axis and being movable therealong; bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; a first pair of levers of equal lengths pivotally connected to said bearing means for turning movement about said turning axis thereof and extending from said bearing means toward said optical axis; a second pair of levers of equal lengths, and having a length equal to the length of said first pair of levers, pivotally connected to said objective means for turning movement with respect thereto about an axis passing through the optical axis and parallel to said turning axis of said bearing means, said second pair of levers extending toward said first straight line and having free ends respectively pivotally connected to said first levers at the free ends of the latter, whereby said first and second pairs of levers form a pair of toggle linkages; and an elongated bar extending along a straight line which is perpendicular to and intersects a straight line interconnecting said objective means and said turning axis of said bearing means, said bar being pivotally connected to one lever and slidably connected to the other lever of one of said pairs of levers and also being slidably engaged by said drive means, so that during movement of said drive means along said first straight line the turning of said bar will move all of said levers to shift said objective means along said optical axis while said bar remains at all times perpendicular to the straight line which interconnects the turning axis of said bearing means and said objective means.

22. In a photographic enlarger, copier, or the like, in combination, objective means having an optical axis and being movable therealong; bearing means providing a turning axis perpendicular to a plane which includes said optical axis and spaced therefrom by a distance equal to the focal length of said objective means; drive means; moving means operatively connected to said drive means for moving and locating said drive means at all times along a first straight line, in said plane, parallel to said optical axis and intersecting said turning axis; a first pair of levers of equal lengths pivotally connected to said bearing means for turning movement about said turning axis thereof and extending from said bearing means toward said optical axis; a second pair of levers of equal lengths, and having a length equal to the length of said first pair of levers, pivotally connected to said objective means for turning movement with respect thereto about an axis passing through the optical axis and parallel to said turning axis of said bearing means, said second pair of levers extending toward said first straight line and having free ends respectively pivotally connected to said first levers at the free ends of the latter, whereby said first and second pairs of levers form a pair of toggle linkages; and an elongated bar extending along a straight line which is perpendicular to and intersects a straight line interconnecting said objective means and said turning axis of said bearing means, said bar being pivotally connected to one lever and slidably connected to the other lever of one of said pairs of levers and also being slidably engaged by said drive means, so that during movement of said drive means along said first straight line the turning of said bar will move all of said levers to shift said objective means along said optical axis while said bar remains at all times perpendicular to the straight line which interconnects the turning axis of said bearing means and said objective means, said bar being connected to said levers at the pivotal interconnection between said first and second pairs of levers, whereby the intersection between a straight line extending between and interconnecting said turning axis of said bearing means and said objective means and a straight line extending along said bar will at all times be located along a straight line which is parallel to and located midway between said optical axis and said first straight line.

References Cited by the Examiner
UNITED STATES PATENTS

| | | | |
|---|---|---|---|
| 1,400,412 | 12/21 | Brigden | 88—24 |
| 2,190,815 | 2/40 | Wenczler | 88—24 |
| 2,596,702 | 5/52 | Macleish | 88—24 |
| 2,625,075 | 1/53 | Baasner et al. | 88—24 |
| 2,704,484 | 3/55 | Schwesinger | 88—24 |
| 2,762,258 | 9/56 | Uschmann | 88—24 |
| 2,889,741 | 6/59 | Luz | 88—24 |
| 2,985,066 | 5/61 | Hauptvogel et al. | 88—24 |

NORTON ANSHER, *Primary Examiner.*

EMIL G. ANDERSON, *Examiner.*